United States Patent
Mori et al.

(10) Patent No.: US 10,046,736 B2
(45) Date of Patent: Aug. 14, 2018

(54) ANTI-THEFT DEVICE OF OPERATIONAL VEHICLE

(71) Applicant: TADANO LTD., Kagawa (JP)

(72) Inventors: Kenji Mori, Kagawa (JP); Masashi Atsumi, Kagawa (JP); Taichi Nomura, Kagawa (JP)

(73) Assignee: TADANO LTD., Kagawa (JP)

( * ) Notice: Subject to any disclaimer, the term of this patent is extended or adjusted under 35 U.S.C. 154(b) by 82 days.

(21) Appl. No.: 14/899,055

(22) PCT Filed: Apr. 14, 2014

(86) PCT No.: PCT/JP2014/002101
§ 371 (c)(1),
(2) Date: Dec. 16, 2015

(87) PCT Pub. No.: WO2014/207973
PCT Pub. Date: Dec. 31, 2014

(65) Prior Publication Data
US 2016/0121850 A1    May 5, 2016

(30) Foreign Application Priority Data
Jun. 26, 2013   (JP) ................................. 2013-134113

(51) Int. Cl.
*B60R 25/24*     (2013.01)
*B60R 25/00*     (2013.01)
(Continued)

(52) U.S. Cl.
CPC ............ *B60R 25/24* (2013.01); *B60R 25/001* (2013.01); *B60R 25/241* (2013.01); *B60R 25/093* (2013.01);
(Continued)

(58) Field of Classification Search
CPC ..... B60R 25/24; B60R 25/001; B60R 25/093; B60R 25/2072; B60R 25/241; B60R 2325/308
See application file for complete search history.

(56) References Cited

U.S. PATENT DOCUMENTS 4,360,074 A * 11/1982 Parquet ................. B60R 25/001
                                                        180/287
4,417,644 A * 11/1983 Brogard ................ B60R 25/001
                                                        180/287
(Continued)

FOREIGN PATENT DOCUMENTS

JP    2006-001421 A        1/2006
JP    2006001421 A  *      1/2006
(Continued)

OTHER PUBLICATIONS

Espacenet Translation of JP2006001421A, Akita, Jan. 5, 2006, 20 pages.*

(Continued)

*Primary Examiner* — Dale W Hilgendorf

(57) ABSTRACT

An anti-theft device of an operational vehicle, in which an operation of cancelling an anti-theft mode is simply and easily performed, is provided. The anti-theft device includes: a travel regulation unit (70) which maintains, when the anti-theft mode is set, the operational vehicle (1) in a state where the operational vehicle (1) cannot travel; and a wireless operation terminal (80) which wirelessly operates an operational device (20). When the wireless operation terminal (80) communicates with a controller (70), the wireless operation terminal (80) performs identification authentication, and when the identification authentication between the wireless operation terminal (80) and the controller (70) is successfully performed, the travel regulation unit (70) cancels the anti-theft mode. Since the wireless (Continued)

operation terminal (80) is only made to communicate with the controller (70), and thus the anti-theft mode is cancelled, the operation of cancelling the anti-theft mode is simply and easily performed.

1 Claim, 3 Drawing Sheets

(51) Int. Cl.
  *B60R 25/09* (2013.01)
  *B60R 25/20* (2013.01)
(52) U.S. Cl.
  CPC ..... *B60R 25/2072* (2013.01); *B60R 2325/308* (2013.01)

(56) References Cited

U.S. PATENT DOCUMENTS

| | | | |
|---|---|---|---|
| 5,441,124 A * | 8/1995 | Rubin | B60R 25/001 180/287 |
| 6,930,591 B2 * | 8/2005 | Asakage | B60R 25/24 701/50 |
| 6,998,957 B2 * | 2/2006 | Shibata | B60R 25/2018 307/10.3 |
| 7,002,465 B2 * | 2/2006 | Komatsu | B60R 25/24 340/426.1 |
| 8,299,891 B2 * | 10/2012 | Yamamoto | B60R 25/24 307/10.1 |
| 2007/0223152 A1 | 9/2007 | Murakami et al. | |

FOREIGN PATENT DOCUMENTS

JP  2009-154740 A  7/2009
JP  2011-166882 A  8/2011

OTHER PUBLICATIONS

International Search Report for PCT/JP2014/002101, dated Jul. 8, 2014.
State Intellectual Property Office of the People's Republic of China, Office Action for Chinese patent application No. 201480034243.5, dated Jul. 5, 2017.

* cited by examiner

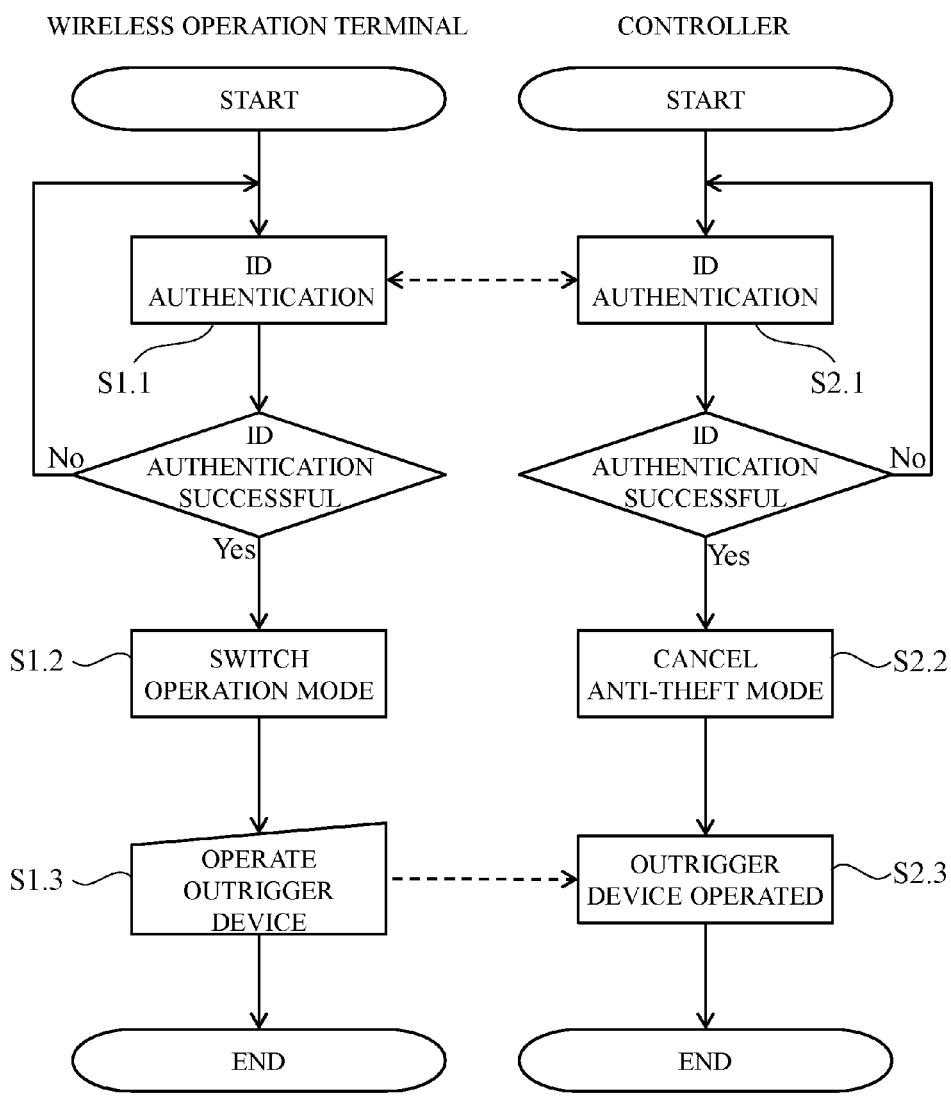
F I G. 2

ANTI-THEFT DEVICE OF OPERATIONAL VEHICLE

TECHNICAL FIELD

The present invention relates to an anti-theft device of an operational vehicle. More specifically, the present invention relates to an anti-theft device of an operational vehicle in which a theft is prevented by maintaining the operational vehicle in a state where it cannot travel.

BACKGROUND ART

In recent years, the number of thefts of operational vehicles such as a crane vehicle and an aerial operation vehicle has been increased. Hence, as an anti-theft measure, an anti-theft device has been provided in an operational vehicle.

An example of the anti-theft device of an operational vehicle is disclosed in patent literature 1.

The anti-theft device of patent literature 1 is a controller of an operational vehicle on which an operational device driven by a hydraulic actuator is mounted, and includes a switch that sets an anti-theft mode and an operating regulation unit that locks, when the anti-theft mode is set, a double-acting cylinder for driving a control valve which controls the hydraulic actuator and thereby regulates its operation. When the anti-theft mode is set in the storage of the operational vehicle, even if an operation for the purpose of a theft is performed while the operational vehicle is being stored, since the control valve is locked by the operating regulation unit, it is impossible to operate the hydraulic actuator to steal the operational vehicle, with the result that the theft of the operational vehicle is reliably prevented.

Conventionally, in order to cancel the anti-theft mode in such an anti-theft device, the inputting of a security code is performed. However, an input device suitable for the inputting of a security code is not provided in an operational vehicle, and a security code is input by operating switches that also serve as other devices. Hence, disadvantageously, the inputting of a security code is complicated, and an operation of cancelling the anti-theft mode is troublesome.

CITATION LIST

Patent Literature

Patent Literature 1: Japanese Unexamined Patent Application Publication No. 2009-154740

SUMMARY OF INVENTION

Technical Problem

In view of the foregoing conditions, the present invention has an object to provide an anti-theft device of an operational vehicle in which an operation of cancelling an anti-theft mode is simply and easily performed.

Solution to Problem

An anti-theft device of an operational vehicle according to a first invention is an anti-theft device of an operational vehicle including an operational device, and includes: a travel regulation unit which maintains, when an anti-theft mode is set, the operational vehicle in a state where the operational vehicle cannot travel; and a wireless operation terminal which wirelessly communicates with a controller that controls an operation of the operational device and which wirelessly operates the operational device, and when the wireless operation terminal communicates with the controller, the wireless operation terminal performs identification authentication, and when the identification authentication between the wireless operation terminal and the controller is successfully performed, the travel regulation unit cancels the anti-theft mode. In an anti-theft device of an operational vehicle according to a second invention, in the first invention, when the anti-theft mode is set, the travel regulation unit maintains an outrigger device of the operational device in a grounded state, and the wireless operation terminal has a plurality of operation modes, and when the identification authentication with the controller is successfully performed, the wireless operation terminal is switched to an outrigger operation mode for operating the outrigger device. In an anti-theft device of an operational vehicle according to a third invention, in the second invention, when the identification authentication with the controller is successfully performed, and the anti-theft mode is set at a time of the identification authentication, the wireless operation terminal is switched to the outrigger operation mode.

Advantageous Effects of Invention

In the first invention, since the wireless operation terminal is only made to communicate with the controller and thus the anti-theft mode is cancelled, the operation of cancelling the anti-theft mode is simply and easily performed. Since the wireless operation terminal for wirelessly operating the operational device is used as a key, in a normal operation process of the user, the anti-theft mode is automatically cancelled, with the result that convenience is enhanced.

In the second invention, since the anti-theft mode is cancelled and the wireless operation terminal is automatically switched to the outrigger operation mode, the outrigger devices are stored as they are, and thus it is possible to bring the operational vehicle into a state where it can travel, with the result that the troublesomeness of the user can be omitted.

In the third invention, when the anti-theft mode is set at the time of the ID authentication, since the operation mode of the wireless operation terminal is switched, even if the ID authentication is performed in the operation using the operational device, the mode is prevented from being uselessly switched to the outrigger operation mode.

BRIEF DESCRIPTION OF DRAWINGS

FIG. 2 A flowchart of cancellation of an anti-theft mode; and

DESCRIPTION OF EMBODIMENTS

Embodiments of the present invention will then be described with reference to drawings.

An anti-theft device of an operational vehicle according to the present invention is provided in an operational vehicle such as a mobile crane, an aerial operational vehicle, a wheel loader or a hydraulic excavator. Examples of the mobile crane include an all-terrain crane, a rough terrain crane, a truck crane and a loading-type truck crane. Although in the following discussion, an example of the loading-type truck crane will be described, the anti-theft device of an operational vehicle according to the present invention can be provided in other operational vehicles.

The configuration of the loading-type truck crane will first be described.

Figure 3:
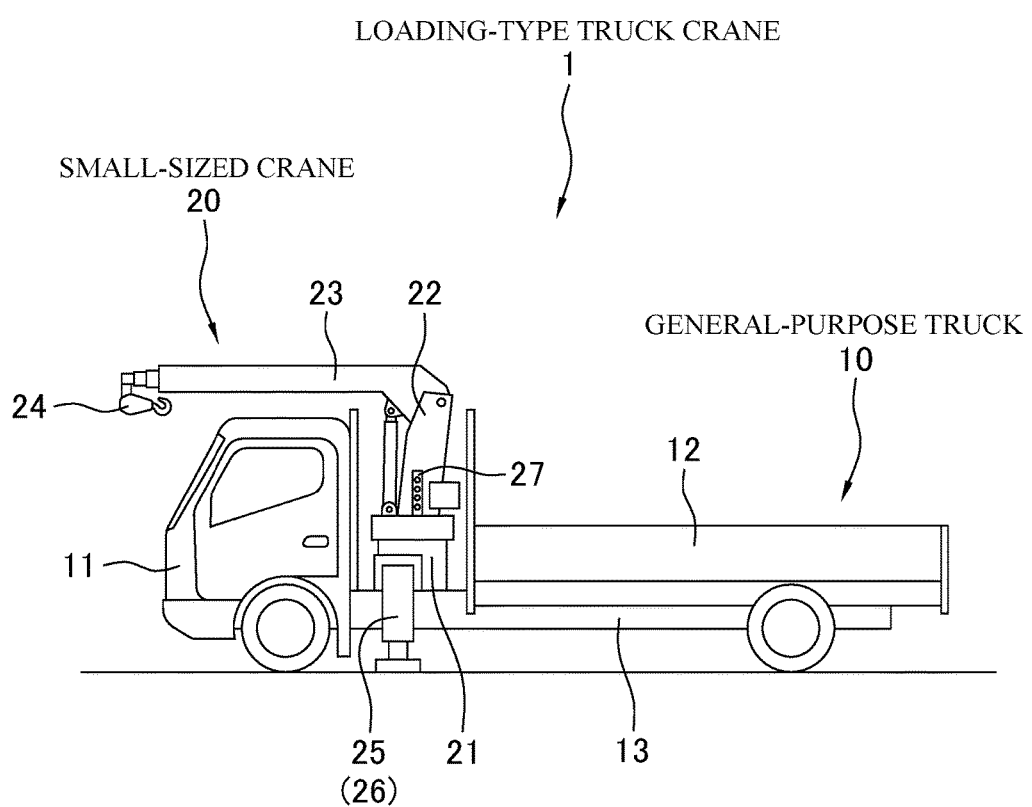
FIG. 3 A side view of the loading-type truck crane.

As shown in FIG. 3, in the loading-type truck crane 1, a small-sized crane 20 is mounted on a vehicle frame 13 between an operator cab 11 and a loading platform 12 in a general-purpose truck 10.

The small-sized crane 20 includes a base 21 which is fixed on the vehicle frame 13, a post 22 which is provided on the base 21 such that the post 22 can be slewed and a boom 23 which is provided at an upper end portion of the post 22 such that the boom 23 can be derricked. A winch is incorporated in the post 22, a wire rope is guided from the winch to a tip end portion of the boom 23 and is passed over a hook 24 through a pulley at the tip end of the boom 23 and thus the hook 24 is suspended from the tip end portion of the boom 23. The crane device is formed with the post 22, the boom 23, the hook 24 and the like. The small-sized crane 20 also includes outrigger devices 25 and 26 which are provided on both the left and right sides of the base 21. In the following description, the crane device (the post 22, the boom 23 and the hook 24) and the outrigger devices 25 and 26 are collectively referred to as an "operational device". In the small-sized crane 20, a lever group 27 for operating the operational device is provided on both the left and right sides of the base 21.

Figure 1:
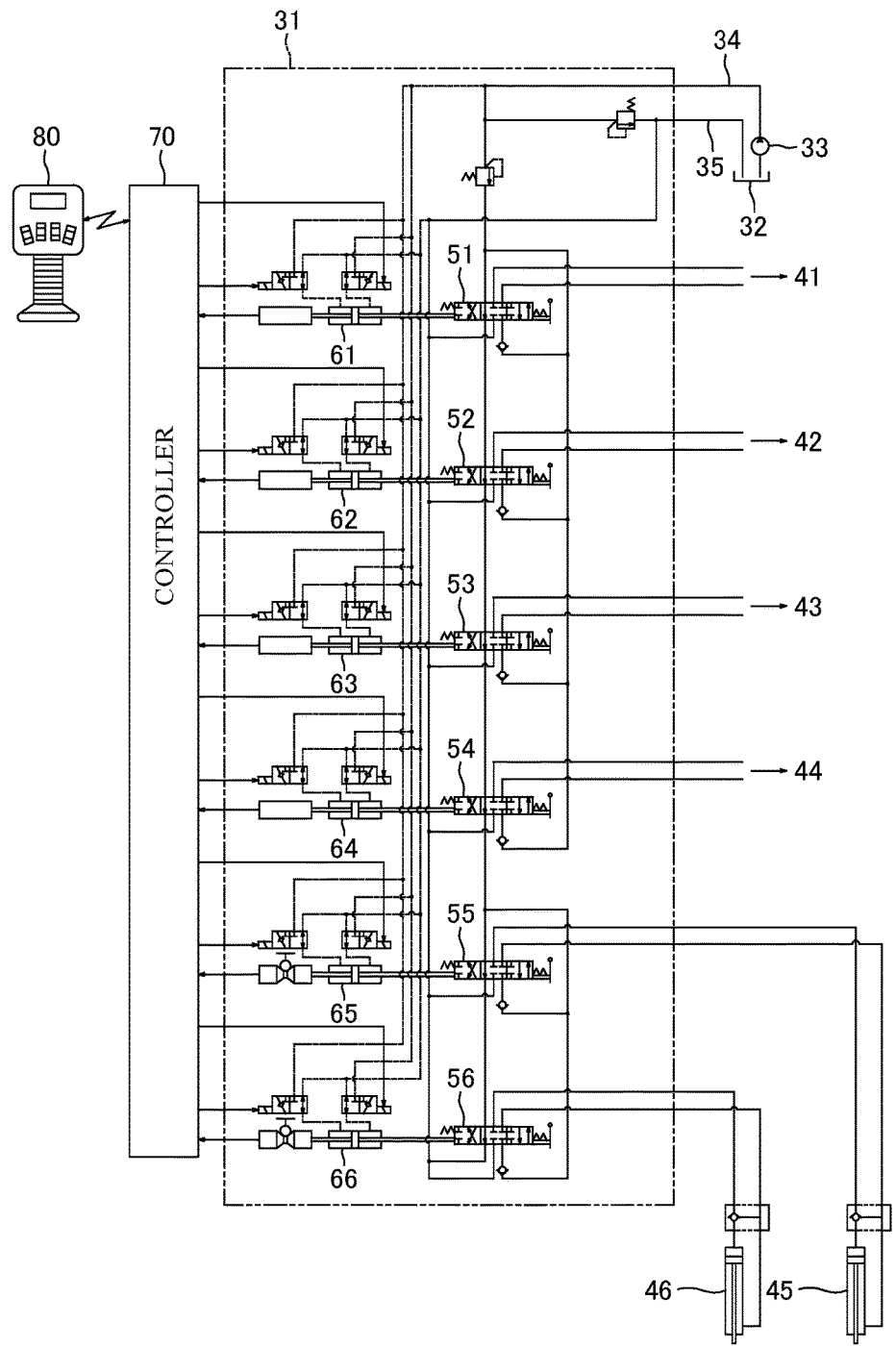
FIG. 1 A hydraulic circuit diagram of a loading-type truck crane including an anti-theft device according to an embodiment of the present invention.

As shown in FIG. 1, the hydraulic circuit of the small-sized crane 20 is mainly formed with a hydraulic valve unit 31, a hydraulic pump 33 which supplies a hydraulic fluid within a tank 32 to the hydraulic valve unit 31, a main flow path 34 which connects the hydraulic pump 33 and the hydraulic valve unit 31, a return flow path 35 which connects the hydraulic valve unit 31 and the tank 32 and hydraulic actuators 41 to 46 which are connected to the hydraulic valve unit 31.

The hydraulic actuators 41 to 46 connected to the hydraulic valve unit 31 are a boom expansion and contraction hydraulic cylinder 41, a winch hydraulic motor 42, a boom derricking hydraulic cylinder 43, a slewing hydraulic motor 44 and outrigger hydraulic cylinders 45 and 46. The boom 23 is expanded and contracted by the operation of the boom expansion and contraction hydraulic cylinder 41, the hook 24 is lifted and lowered by being wound through the operation of the winch hydraulic motor 42, the boom 23 is derricked by the operation of the boom derricking hydraulic cylinder 43, the post 22 is slewed by the operation of the slewing hydraulic motor 44 and the outrigger devices 25 and 26 are expanded and contracted by the operations of the outrigger hydraulic cylinders 45 and 46.

In the hydraulic valve unit 31, an expansion and contraction switching control valve 51, a winch switching control valve 52, a derricking switching control valve 53, a slewing switching control valve 54 and outrigger switching control valves 55 and 56 are provided. The boom expansion and contraction hydraulic cylinder 41 is connected to the expansion and contraction switching control valve 51, the winch hydraulic motor 42 is connected to the winch switching control valve 52, the boom derricking hydraulic cylinder 43 is connected to the derricking switching control valve 53, the slewing hydraulic motor 44 is connected to the slewing switching control valve 54 and the outrigger hydraulic cylinders 45 and 46 are connected to the outrigger switching control valves 55 and 56 and the direction of and the amount of flow of pressure oil supplied from the hydraulic pump 33 are controlled, with the result that the operations of the hydraulic actuators 41 to 46 can be controlled to be switched.

Levers are attached to the switching control valves 51 to 56, the levers are manually operated and thus the direction of and the amount of flow of the pressure oil supplied from the hydraulic pump 33 can be switched. The levers attached to the switching control valves 51 to 56 are provided as the lever group 27 on both the left and right sides of the base 21 (see FIG. 3). Hence, the lever group 27 is operated by a user, and thus it is possible to operate the operational device.

Pilot cylinders 61 to 66 are also attached to the switching control valves 51 to 56, the pilot cylinders 61 to 66 are operated and thus the direction of and the amount of flow of the pressure oil supplied from the hydraulic pump 33 can also be switched.

Each of the pilot cylinders 61 to 66 is a double-acting cylinder, and an electromagnetic valve which supplies and removes the pressure oil to and from a right-side oil chamber and an electromagnetic valve which supplies and removes the pressure oil to and from a left-side oil chamber are individually provided. These electromagnetic valves are connected to a controller 70 which is formed with a known computer or the like, and are operated based on control signals from the controller 70 to drive the pilot cylinders 61 to 66 and switch the switching control valves 51 to 56. As described above, the controller 70 controls the operation of the operational device.

The controller 70 can wirelessly communicate with a wireless operation terminal 80 (so-called a radio control transmitter). On the wireless operation terminal 80, not only operation devices such as various types of switches and levers but also a display such as a liquid crystal panel and the like are mounted. When the user operates the operation device of the wireless operation terminal 80, the wireless operation terminal 80 transmits an operation signal to the controller 70, and the controller 70 drives, based on the operation signal, the pilot cylinders 61 to 66 to operate the operational device. As described above, the user uses the wireless operation terminal 80 and thereby can wirelessly operate the operational device.

The wireless operation terminal 80 has a plurality of operation modes in order to enhance operability in the limited operation device. For example, the wireless operation terminal 80 has a crane operation mode for operating the crane device (the post 22, the boom 23 and the hook 24), an outrigger operation mode for operating the outrigger devices 25 and 26 and the like. For example, the operation modes are switched by pressing down a specific switch.

In order to prevent an interference, a one-to-one combination between the wireless operation terminal 80 and the controller 70 is achieved, and thus it is impossible to perform the wireless operation by a different combination. Specifically, the wireless operation terminal 80 has an ID unique for each terminal, and the ID is stored in the controller 70 pairing therewith. The wireless operation terminal 80 performs ID authentication in communication with the controller 70, and only when the ID authentication is successfully performed, the wireless operation of the operational device can be performed.

Although a method of performing the ID authentication between the wireless operation terminal 80 and the controller 70 is not particularly limited, for example, the following method is used to perform the ID authentication.

When power is supplied, the wireless operation terminal 80 performs carrier sense for searching for a frequency channel which can be used for communication with the controller 70. Then, the wireless operation terminal 80 uses an available frequency channel to transmit a transmission signal to the controller 70. The transmission signal includes various types of information and the ID unique to the wireless operation terminal 80. On the other hand, the controller 70 also performs carrier sense. When the transmission signal from the wireless operation terminal 80 is received, the ID included in the transmission signal is verified against the ID stored, and thus the ID authentication is performed. When the ID authentication is successfully performed (the IDs are matched), a reception signal including the ID is transmitted to the wireless operation terminal 80. When the wireless operation terminal 80 detects the reception signal from the controller 70, the wireless operation terminal 80 verifies the ID included in the reception signal against the ID stored to perform the ID authentication. When the ID authentication is successfully performed (the IDs are matched), a communication state between the wireless operation terminal 80 and the controller 70 where the operation signal can be exchanged is established.

In the example described above, the ID authentication is performed when communication between the wireless operation terminal 80 and the controller 70 is established. The establishment of the communication is made, for example, (a) when power is supplied to the wireless operation terminal 80 or the controller 70, (b) when the communication is interrupted by a jammer and (c) when the "power-saving mode", in which when the wireless operation terminal 80 is not operated for a predetermined time or more, the wireless operation terminal 80 stops the emission of radio waves, is completed and the state is returned to the state of normal communication. Since among them, (b) and (c) can occur in the normal operation in which the operational device is operated, there is a possibility that the ID authentication is performed even in the operation.

In the anti-theft device of the present embodiment, when the outrigger devices 25 and 26 are brought into a grounded state, and the mode is set at the anti-theft mode, the grounded state of the outrigger devices 25 and 26 is maintained regardless of the operation of the lever group 27 or the like. In this way, the loading-type truck crane 1 is maintained in a state where it cannot travel, and thus the prevention of a theft is realized. Here, the grounded state of the outrigger devices 25 and 26 is a state where the outrigger hydraulic cylinders 45 and 46 are extended and the float of the outrigger devices 25 and 26 makes contact with the ground (see FIG. 3) or a state where the body of the loading-type truck crane 1 is floated by the outrigger devices 25 and 26. The outrigger devices 25 and 26 may be brought into the grounded state while they are being projected in the direction of the width of the loading-type truck crane 1 or may be brought into the grounded state while they are being stored.

Although a specific method of maintaining the grounded state of the outrigger devices 25 and 26 is not particularly limited, for example, the following methods can be adopted.

When the anti-theft mode is set, the pressure oil is supplied to both the oil chambers of the pilot cylinders 65 and 66 for driving the outrigger switching control valves 55 and 56. In this way, the outrigger switching control valves 55 and 56 are locked, and thus the grounded state of the outrigger devices 25 and 26 is maintained regardless of the operation of the lever group 27 or the like.

When the anti-theft mode is set, the control signal from the controller 70 is regulated to prevent the outrigger devices 25 and 26 from being operated, with the result that the grounded state may be maintained.

When the anti-theft mode is set, for example, the unloading valve of the hydraulic valve unit 31 is brought into an unloaded state to interrupt the supply of the pressure oil to the outrigger hydraulic cylinders 45 and 46 and thereby prevent the outrigger devices 25 and 26 from being operated, with the result that the grounded state may be maintained.

In the example described above, a travel regulation unit that maintains the loading-type truck crane 1 in the state where it cannot travel is realized by the controller 70. In other words, the controller 70 of the present embodiment has, as part of its functions, the function of the "travel regulation unit". The travel regulation unit may be configured as a device separate from the controller 70 which controls the operation of the operational device. In this case, the travel regulation unit and the controller 70 are configured such that they can communicate with each other.

(Setting of Anti-Theft Mode)

The setting of the anti-theft mode will next be described. When the loading-type truck crane 1 is stored, the anti-theft mode is set in the following procedure.

The user first operates the wireless operation terminal 80 or the lever group 27 to bring the outrigger devices 25 and 26 into the grounded state. In this way, the loading-type truck crane 1 enters the state where it cannot travel.

Then, for example, the user presses down a specific switch of the wireless operation terminal 80 to set the anti-theft mode. The wireless operation terminal 80 transmits a setting signal to the controller 70 (the travel regulation unit), and the setting of the anti-theft mode is stored in the controller 70 (the travel regulation unit) which receives the setting signal.

The anti-theft mode may be set by using a means separate from the wireless operation terminal 80. For example, a setting device for setting the anti-theft mode may be connected to the controller 70. The setting device is formed with a switch and the like and is attached to an area near the lever group 27.

When the anti-theft mode is set, a message indicating such information is issued as a sound or a display. For example, the message is issued as a sound from a speaker connected to the controller 70. The message is displayed on the display of the wireless operation terminal 80.

Next, the user stops the engine of the loading-type truck crane 1, and stores the wireless operation terminal 80 in an area away from the loading-type truck crane 1, for example, an office.

When the anti-theft mode is set, the controller 70 (the travel regulation unit) maintains the outrigger devices 25 and 26 in the grounded state regardless of the operation of the lever group 27 or the like. In this way, the loading-type truck crane 1 is maintained in the state where it cannot travel. Thus, it is possible to prevent the loading-type truck crane 1 from being stolen by being driven. Since the loading-type truck crane 1 is stored separately from the wireless operation terminal 80, the loading-type truck crane 1 without the wireless operation terminal 80 is decreased in value, with the result that an anti-theft effect is also produced.

(Cancellation of Anti-Theft Mode)

The cancellation of the anti-theft mode will next be described with reference to FIG. 2. When the loading-type truck crane 1 is used, the anti-theft mode is cancelled in the following procedure.

The user first starts the engine of the loading-type truck crane 1. Thus, power is supplied to the controller 70.

Then, the user carries the wireless operation terminal 80 out from a storage area such as an office, and power is supplied to the wireless operation terminal 80. Then, the wireless operation terminal 80 establishes communication with the controller 70, and performs the ID authentication in the process thereof (steps S1.1 and S2.1).

When the controller 70 (the travel regulation unit) successfully performs the ID authentication with the wireless operation terminal 80, the controller 70 cancels the anti-theft mode (step S2.2). In other words, the controller 70 returns the outrigger devices 25 and 26 to a state where they can be operated. The cancellation of the anti-theft mode is stored in the controller 70 (the travel regulation unit). When the anti-theft mode is cancelled, a message indicating such information is issued as a sound or a display. For example, the message is issued as a sound from a speaker connected to the controller 70.

Since as described above, power is supplied to the wireless operation terminal 80, the wireless operation terminal 80 is only made to communicate with the controller 70 and thus the anti-theft mode is cancelled, it is not necessary to input a security code, and the operation of cancelling the anti-theft mode is simply and easily performed. Since the wireless operation terminal 80 for wirelessly operating the operational device is used as a key, in a normal operation process of the user, that is, in an operation process of storing the outrigger devices 25 and 26 with the wireless operation terminal 80, the anti-theft mode is automatically cancelled. Hence, the user does not need to perform a special operation, and thus convenience is enhanced.

On the other hand, in the wireless operation terminal 80, the anti-theft mode is cancelled, and the mode is switched to the outrigger operation mode for operating the outrigger devices 25 and 26. Specifically, when the wireless operation terminal 80 successfully performs the ID authentication with the controller 70, the mode is switched to the outrigger operation mode (S1.2)

As described previously, (b) when the communication is interrupted by a jammer and (c) when the "power-saving mode", in which when the wireless operation terminal 80 is not operated for a predetermined time or more, the wireless operation terminal 80 stops the emission of radio waves, is completed and the state is returned to the state of normal communication, there is a possibility that the ID authentication is performed even in the normal operation. In this case, since the anti-theft mode has already been cancelled, it is not necessary to switch the wireless operation terminal 80 to the outrigger operation mode.

Hence, the wireless operation terminal 80 is preferably configured such that when the wireless operation terminal 80 successfully performs the ID authentication with the controller 70 and the anti-theft mode is set at the time of the ID authentication, the mode is switched to the outrigger operation mode. In this case, at the time of the establishment of the communication, information indicating whether the anti-theft mode is set or cancelled is transmitted from the controller 70 (the travel regulation unit) to the wireless operation terminal 80.

In this way, when the anti-theft mode is set at the time of the ID authentication, since the operation mode of the wireless operation terminal 80 is switched, even if the ID authentication is performed in the operation using the operational device, the mode is prevented from being uselessly switched to the outrigger operation mode.

Since as described above, the anti-theft mode is cancelled and the wireless operation terminal 80 is automatically switched to the outrigger operation mode, the user operates the wireless operation terminal 80 as it is, stores the outrigger devices 25 and 26 and thereby can bring the loading-type truck crane 1 into a state where it can travel (steps S1.3 and S2.3). Hence, the operation of switching the operation mode of the wireless operation terminal 80 by the user can be omitted.

When the anti-theft mode is cancelled, the operation of the outrigger devices 25 and 26 can be performed even with the lever group 27.

Incidentally, even when another wireless operation terminal 80 which does not pair with the controller 70 mounted on the loading-type truck crane 1 is used to try to cancel the anti-theft mode, the ID authentication is unsuccessfully performed at the time of the establishment of the communication, and thus the anti-theft mode is not cancelled. Hence, it is possible to maintain the anti-theft mode and prevent the theft of the loading-type truck crane 1. As described above, the ID unique to the wireless operation terminal 80 is used to cancel the anti-theft mode, and thus the safety and the anti-theft effect are enhanced as compared with the case where a security code is input.

Other Embodiments

When the operational vehicle is a wheel loader, a blade provided in the wheel loader is lowered to be grounded, and thus it is possible to bring the wheel loader into a state where it cannot travel. Hence, the travel regulation unit is configured such that when the anti-theft mode is set, the state where the blade is lowered to be grounded is maintained.

When the operational vehicle is a hydraulic excavator, a bucket provided in the hydraulic excavator is lowered to be grounded, and thus it is possible to bring the hydraulic excavator into a state where it cannot travel. Hence, the travel regulation unit is configured such that when the anti-theft mode is set, the state where the bucket is lowered to be grounded is maintained.

The travel regulation unit may be configured such that instead of the configuration in which the operational device such as the outrigger devices 25 and 26, the blade or bucket is maintained in the state where the operational vehicle cannot travel, the operational vehicle is maintained by another method in the state where the operational vehicle cannot travel. For example, the travel regulation unit may be configured such that the engine of the operational vehicle is prevented from being started up and thus the operational vehicle is maintained in the state where the operational vehicle cannot travel.

REFERENCE SIGNS LIST

1 loading-type truck crane
10 general-purpose truck
20 small-sized crane
21 base
22 post
23 boom
24 hook
25, 26 outrigger device
27 lever group
31 hydraulic valve unit
41 to 46 hydraulic actuator
51 to 56 switching control valve
61 to 66 pilot cylinder
70 controller
80 wireless operation terminal

The invention claimed is:

1. An anti-theft device of an operational vehicle including an operational device, the anti-theft device comprising:
    a travel regulation unit which maintains, when an anti-theft mode is set, the operational vehicle in a state where the operational vehicle cannot travel; and
    a wireless operation terminal which wirelessly communicates with a controller that controls an operation of the operational device and which wirelessly operates the operational device,
    wherein
    the wireless operation terminal establishes communication with the controller and identification authentication is performed in a process of establishment of the communication, and
    when the communication between the wireless operation terminal and the controller is established, the travel regulation unit cancels the anti-theft mode,
    wherein when the anti-theft mode is set, the travel regulation unit maintains an outrigger device of the operational device in a grounded state, and the wireless operation terminal has a plurality of operation modes, and when the communication between the wireless operation terminal and the controller is established, and the anti-theft mode is set at time of the identification authentication, the wireless operation terminal is switched to an outrigger operation mode for operating the outrigger device,
    wherein the controller transmits information indicating whether the anti-theft mode is set or cancelled to the wireless operation terminal, so that when the wireless operation terminal successfully performs the identification authentication with the controller and the anti-theft mode is set at the time of the identification authentication, a mode of the wireless operation terminal is switched to the outrigger operation mode.

* * * * *

UNITED STATES PATENT AND TRADEMARK OFFICE
CERTIFICATE OF CORRECTION

PATENT NO. : 10,046,736 B2
APPLICATION NO. : 14/899055
DATED : August 14, 2018
INVENTOR(S) : Kenji Mori et al.

Page 1 of 1

It is certified that error appears in the above-identified patent and that said Letters Patent is hereby corrected as shown below:

In the Claims

Claim 1, Column 10, Line 12, after "mode is set", delete "or cancelled";
Claim 1, Column 10, Line 16, after "mode is set", insert -- in the controller --; and
Claim 1, Column 10, Line 18, after "outrigger operation mode", insert -- to maintain or set the outrigger device in the grounded state and so that when the identification authentication is performed in the operation of the operational device, the mode of the wireless operation terminal is prevented from being switched to the outrigger operation mode --.

Signed and Sealed this
Seventh Day of April, 2020

Andrei Iancu
*Director of the United States Patent and Trademark Office*